(12) United States Patent
Hutchings et al.

(10) Patent No.: US 11,579,675 B2
(45) Date of Patent: Feb. 14, 2023

(54) POWER DISTRIBUTION SYSTEM

(71) Applicant: The Wiremold Company, West Hartford, CT (US)

(72) Inventors: Philip D. Hutchings, Vernon, CT (US); Mark Makwinski, Cromwell, CT (US); Marc Galasso, Beacon Falls, CT (US)

(73) Assignee: THE WIREMOLD COMPANY, West Hartford, CT (US)

( * ) Notice: Subject to any disclaimer, the term of this patent is extended or adjusted under 35 U.S.C. 154(b) by 28 days.

(21) Appl. No.: 16/475,555

(22) PCT Filed: Dec. 27, 2017

(86) PCT No.: PCT/US2017/068491
§ 371 (c)(1),
(2) Date: Jul. 2, 2019

(87) PCT Pub. No.: WO2018/125896
PCT Pub. Date: Jul. 5, 2018

(65) Prior Publication Data
US 2019/0346900 A1  Nov. 14, 2019

Related U.S. Application Data

(60) Provisional application No. 62/440,508, filed on Dec. 30, 2016.

(51) Int. Cl.
*G06F 1/26* (2006.01)
*G06F 1/18* (2006.01)
(Continued)

(52) U.S. Cl.
CPC .............. *G06F 1/266* (2013.01); *G06F 1/189* (2013.01); *H01R 24/62* (2013.01); *H02J 7/00* (2013.01); *H02J 2207/20* (2020.01)

(58) Field of Classification Search
None
See application file for complete search history.

(56) References Cited

U.S. PATENT DOCUMENTS 5,638,402 A  6/1997  Osaka et al.
5,752,046 A  5/1998  Oprescu et al.
(Continued)

FOREIGN PATENT DOCUMENTS

| CN | 104541436 A | 4/2015 |
|---|---|---|
| WO | 2015171463 A1 | 11/2015 |
| WO | 2018128690 A1 | 7/2018 |

OTHER PUBLICATIONS

International Search Report of International App No. PCT/US2017/068491 dated Aug. 27, 2018.
(Continued)

*Primary Examiner* — Fahmida Rahman
(74) *Attorney, Agent, or Firm* — McCormick, Paulding & Huber PLLC

(57) ABSTRACT

A power distribution system includes a plurality of power distribution modules connected to at least one power supply and configured to receive power therefrom. A power distribution bus connects the power distribution modules of the plurality of power distribution modules in parallel. The plurality of power distribution modules executes a distributed system policy management protocol over the power distribution bus to control a supply of available power from the at least one power supply to loads connected to USB charging ports of the power distribution modules.

20 Claims, 6 Drawing Sheets

(51) Int. Cl.
  *H01R 24/62* (2011.01)
  *H02J 7/00* (2006.01)

(56) References Cited

U.S. PATENT DOCUMENTS

| | | | | |
|---|---|---|---|---|
| 7,869,228 | B2* | 1/2011 | Qahouq | G06F 1/206 |
| | | | | 363/21.01 |
| 8,954,762 | B2* | 2/2015 | Boss | G06F 1/266 |
| | | | | 713/300 |
| 9,104,394 | B1 | 8/2015 | Nay | |
| 2009/0001943 | A1* | 1/2009 | Slezak | G05F 1/62 |
| | | | | 323/232 |
| 2011/0302430 | A1 | 12/2011 | Boss et al. | |
| 2012/0079151 | A1* | 3/2012 | Tailliet | G06F 13/4291 |
| | | | | 710/110 |
| 2015/0082059 | A1* | 3/2015 | Boss | G06F 1/266 |
| | | | | 713/320 |
| 2016/0216750 | A1 | 7/2016 | Hundal et al. | |
| 2018/0120910 | A1* | 5/2018 | Farkas | G06F 1/189 |

OTHER PUBLICATIONS

Extended European Search Report dated Jul. 2, 2020 for corresponding EP Application No. EP 17887859.
European Examination Report dated Jul. 1, 2021 for corresponding EP Application No. EP 17887859.1.
Chinese Office Action and its English translation of corresponding CN Application No. 201780087376.2 dated Sep. 7, 2022.

* cited by examiner

POWER DISTRIBUTION SYSTEM

CROSS REFERENCE TO RELATED APPLICATIONS

This application is a National Stage application of International Patent Application No. PCT/EP2017/068491, filed on Dec. 27, 2017, and claims priority to Provisional Application Ser. No. 62/440,508, filed Dec. 30, 2016, which are hereby incorporated by reference in their entirety.

TECHNICAL FIELD

This application relates to a USB Power Distribution System having distributed system policy management.

BACKGROUND

In a Power Distribution System having USB Type-C outlets, the power is supplied and controlled per the Power Delivery specification (PD Spec). The PD Spec is implemented as a software stack (PD Stack). The PD Spec is published by the USB Implementers Forum, Inc. (USB-IF), and is available as part of the USB Specification download package, such as USB Specification download packages revs 3.0 through 3.2 or the like, which include the USB PD Spec, Engineering Chang Notices, and the corresponding Adopters Agreement. In a USB device which functions as a Power Provider, the source port is implemented as a defined software and hardware design comprising a Physical Layer, Protocol Layer, Policy Layer, and Device Policy Manager Layer.

Optionally, as the uppermost layer of the PD protocol stack, a System Policy Manager (SPM) Layer may be implemented, usually as part of the Operating System on the device providing the Power, for example a Desktop PC, Automobile Dashboard mounted Infotainment System, or an AC Powered Desktop Monitor. The SPM is integrated into the device that contains the Primary power Converter (usually, an AC Line Powered Power Supply). The primary function of the SPM is to ensure that the total power supplied to the downstream ports is within the capability of the primary power converter.

In order to regulate the supply of the available power in a logical and safe manner, known systems only permit one SPM and only one Primary power Converter to be active on the USB bus at one time. In these known systems, it is not permitted to connect together two or more powered USB type-C ports and have them share the task of System Policy Management.

SUMMARY

According to the present disclosure, a power distribution system includes a plurality of power distribution modules connected to at least one power supply and configured to receive power therefrom. A power distribution bus connects the power distribution modules of the plurality of power distribution modules in parallel. The plurality of power distribution modules executes a distributed system policy management protocol over the power distribution bus to control a supply of available power from the at least one power supply to loads connected to USB charging ports of the power distribution modules.

Each power distribution module of the plurality may additionally comprise memory storing a power system database identifying each power distribution module of the plurality of power distribution modules and a total power required by each power distribution module. The power system database may additionally store a total power available from the at least one power supply. The power system database may be updated each time a device is connected to or disconnected from the at least one USB charging port and/or each time a power distribution module of the plurality is powered on.

A power distribution module according to the present disclosure may comprise a power input configured to receive power from a power supply, at least one USB charging port, a microcontroller configured to control the distribution of power from the power input to the at least one USB charging port, and a bus interface connectable to a power distribution bus. The bus interface may allow the microcontroller to send and receive signals over the power distribution bus and the microcontroller may be configured to control the distribution of power from the power input to the at least one USB charging port based on information received over the power distribution bus.

According to the present disclosure, a method for distributing power from at least one power supply through a plurality of power distribution modules in communication over a power distribution bus comprises maintaining, in memory at each power distribution module, a power system database identifying each power distribution module of the plurality of power distribution modules and a total power required by each power distribution module of the plurality of power distribution modules. The method further comprises controlling, by a microprocessor of each power distribution module, a supply of power from the at least one power supply to devices connected to USB charging ports of the power distribution module based on the power system database.

These and other objects, features and advantages of the present disclosure will become apparent in light of the detailed description of embodiments thereof, as illustrated in the accompanying drawings.

DETAILED DESCRIPTION

Figure 1:
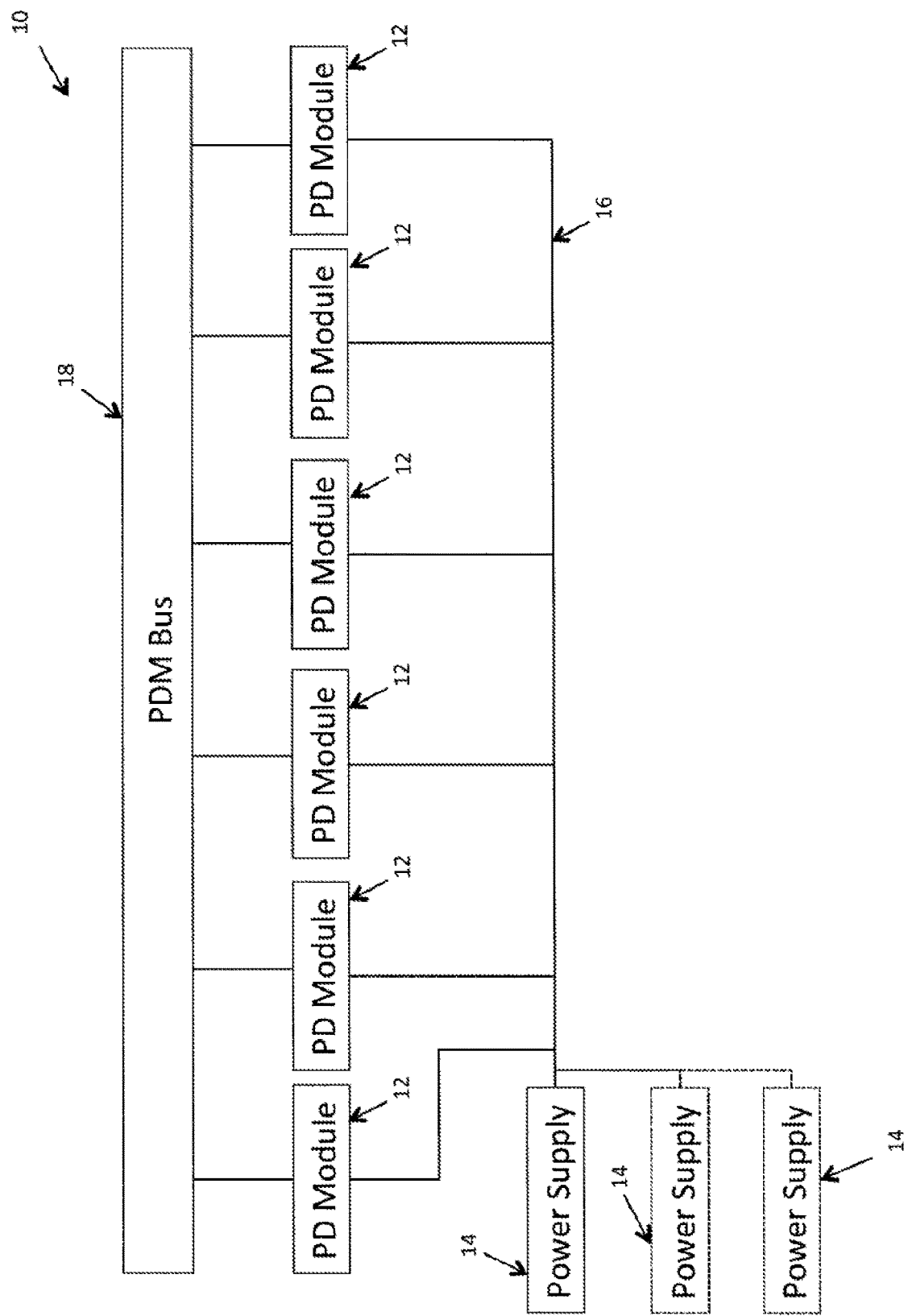
FIG. 1 is schematic diagram of a power distribution system according to the present disclosure.

Before the various embodiments are described in further detail, it is to be understood that the invention is not limited to the particular embodiments described. It will be understood by one of ordinary skill in the art that the systems described herein may be adapted and modified as is appropriate for the application being addressed and that the systems described herein may be employed in other suitable applications, and that such other additions and modifications will not depart from the scope thereof.

In the drawings, like reference numerals refer to like features of the systems of the present application. Accordingly, although certain descriptions may refer only to certain figures and reference numerals, it should be understood that such descriptions might be equally applicable to like reference numerals in other figures.

Referring to FIG. 1, in the present disclosure, a USB Power Distribution system 10 is described that includes a Distributed System Policy Management Protocol controlling the supply of available power. The USB Power Distribution system 10 includes one or multiple Power Distribution Modules (PD Modules) 12, which draw power from a single primary power converter (Power Supply) 14 or multiple parallel-connected primary power converters (Power Supplies) 14 over a power line 16. Although a single line has been used to schematically represent the power line 16 for simplicity, it should be understood that the power line may also include a common grounding wire for the PD Modules 12. The system 10 also includes a PDM bus 18, to which each PD Module 12 is connected to facilitate the Distributed System Policy Management Protocol that controls the supply of the available power to the loads connected to the PD Modules 12 as described below.

Figure 2:
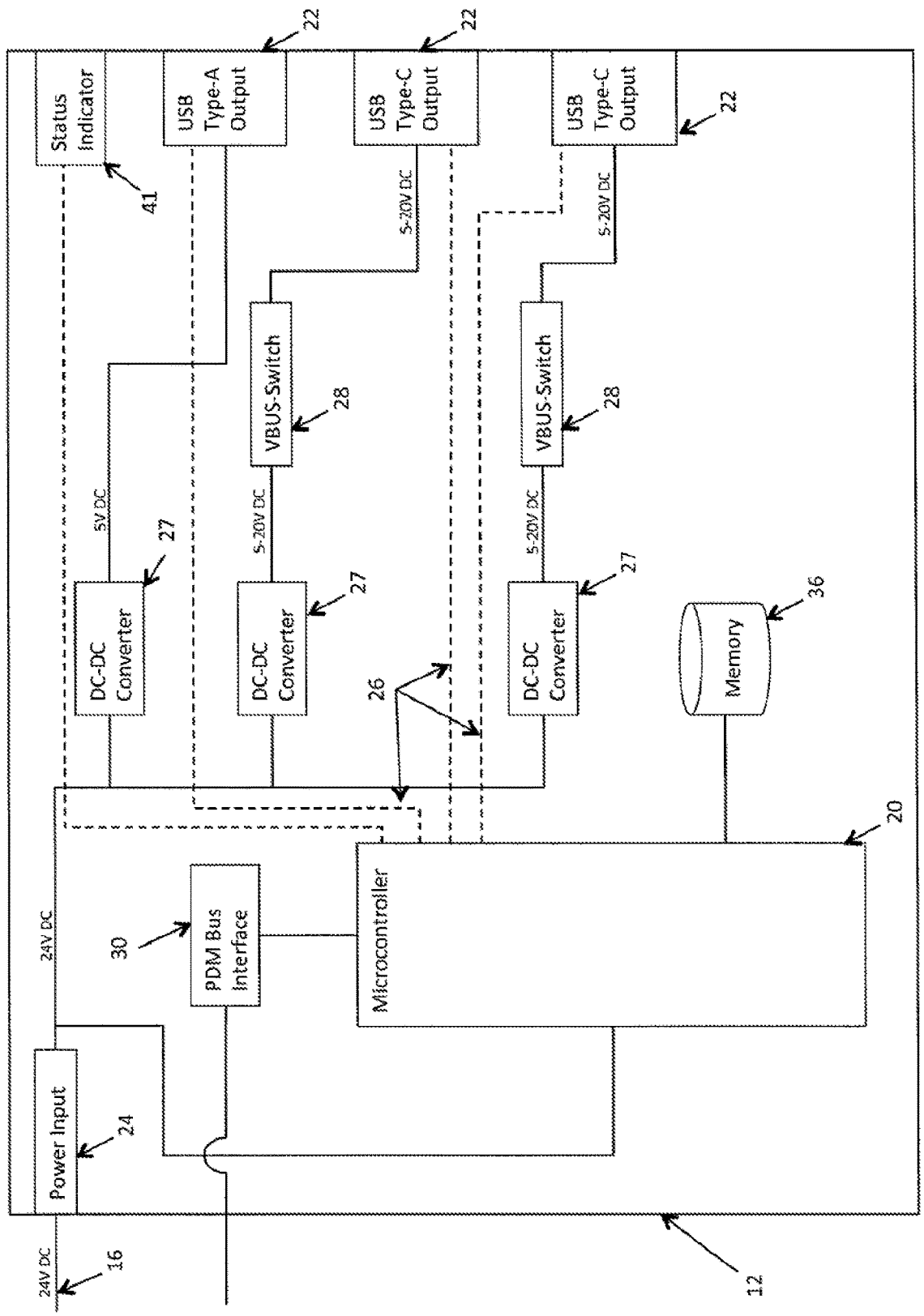
FIG. 2 is a schematic diagram of a power distribution module of the power distribution system of FIG. 1.

Referring to FIG. 2, each PD Module 12 includes an embedded microcontroller 20, one or more USB power outlets 22, which may be, for example, USB Type-A outlets, USB Type-C outlets, or the like, and a power input 24 that is connected to the power supply 14 shown in FIG. 1, over power line 16. The microcontroller 20 communicates with the loads attached to the USB power outlets 22 over communication lines 26 and runs an implementation of the USB PD protocol as defined by USB-IF for controlling power distribution to the USB power outlets 22 through one or more voltage converters 27, switches 28 and/or the like.

As an additional function of the firmware, the PD Module 12 includes a PDM bus interface 30 connecting the PD Module 12 to the PDM Bus 18, shown in FIG. 1. The PDM Bus 18, shown in FIG. 1, is a shared communication bus that connects all of the PD Modules 12 together. For example, the PDM Bus 18, shown in FIG. 1, may be formed as a single wire connecting all of the PD Modules 12 in parallel.

The PDM Bus 18 may be implemented as an asynchronous peer-to-peer serial bus with normally-high, active-low signaling. Each PD Module 12 has a physical driver circuit which may be implemented as an open-collector (pull down to ground) transmitter, and a voltage threshold sensing comparator for receiving and monitoring the voltage on the PDM Bus 18. The physical driver circuit may be designed to withstand accidental miswiring, and may be connected without damage due to reversed DC polarity, short circuit to the positive Power Supply, to Ground or to the negative Power Supply.

Figure 3:
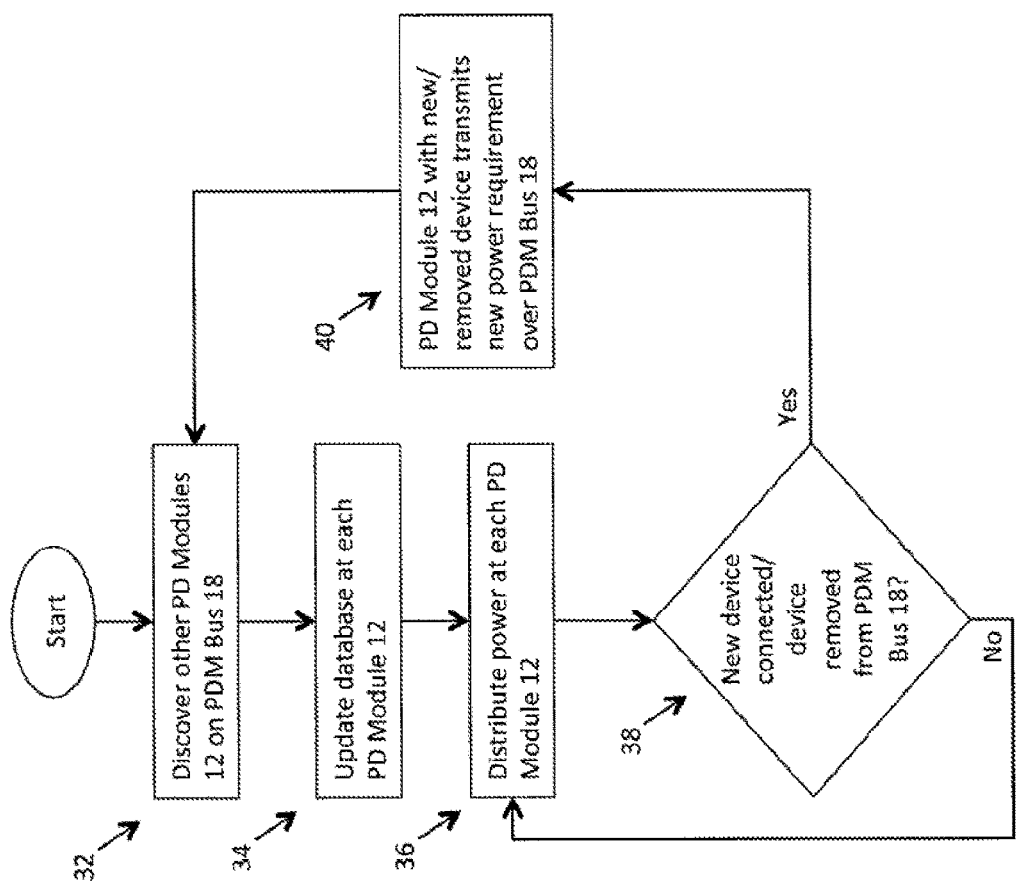
FIG. 3 is a flow diagram of an embodiment for distributing power with the system of FIG. 1.

Each PD Module 12 has a unique serial number or address, for example, implemented as a 4-byte binary value. Referring to FIG. 3, on power-up and at timed intervals afterwards, such as any time a device is connected to, or disconnected from, one of the USB power outlets 22, the PD Module 12 broadcasts a message to discover if other PD Modules 12 are present at step 32. If other PD Modules 12 are found, a collision proof incrementing search protocol identifies the addresses that are occupied. At step 34, each occupied address on the PDM bus 18 is allocated an index into a Power System Overview Database. Each entry in the Power System Overview Database identifies each PD Module 12 by its unique serial number and also provides the total power required by said PD Module 12. The Power System Overview Database is maintained in memory 36, shown in FIG. 2, at each PD Module 12. The Power System Overview Database is shared so that a copy of the database exists in each of the PDM Modules 12 on the PDM bus 18.

The distributed database also has an entry for the total power available to the system (power input) from the Power Supply or Supplies 14. The power input available may be configured, for example, by plugging a computer into one of the USB downstream ports 22 and running a software utility to configure the Power Availability setting. Typically, this would be done at test when the system is packaged for sale. As sold, the system 10 would typically consist of the Power Supply 14 and a number of PD Modules 12, packaged and sold together. However, additional PD Modules 12 may be sold separately and connected to the system 10.

Knowing the total power available to the system and the total power load of all of the PD Modules 12, the microcontroller 20 of each of the PD Modules 12 is able to control the load supported at the power sourcing USB power outlets 22 on its individual PD Module 12 at step 36, in coordination with the microcontrollers 20 of the other PD Modules 12, so that the total system power load does not exceed the capability of the available system power sources.

As illustrated by steps 38 and 40, any time a new load is presented, or an existing load is removed, at one of the PD Modules 12 (i.e. anywhere on the system), the shared database is updated so that each PD Module 12 has information available to calculate the total load presented and power output of the system so that it may continue to allocate power to its power sourcing USB outlets 22 without the total system power load exceeding the available system power.

Thus, in effect, each PD Module 12 acts as a SPM controlling power distribution to its USB outlets 22. However, instead of merely distributing the total power from a single power supply, the PD Modules 12 communicate with each other over the PDM Bus 18 so that each PD Module 12 knows how much of the total available power is available to it. Each PD Module 12 is then able to act as a SPM and distribute power to its USB power outlets 22 without exceeding the total available power to the system.

Referring back to FIG. 2, the PD Modules 12 may also include one or more status indicators 41, such as lights (e.g. light emitting diodes (LEDs)), screens or the like, for providing a feedback to a user of the PD module 12. For example, the status indicators 41 may indicate the voltage being supplied to a device connected to one of the USB power outlets 22, the available power in Watts or any other similar information.

Figure 4:
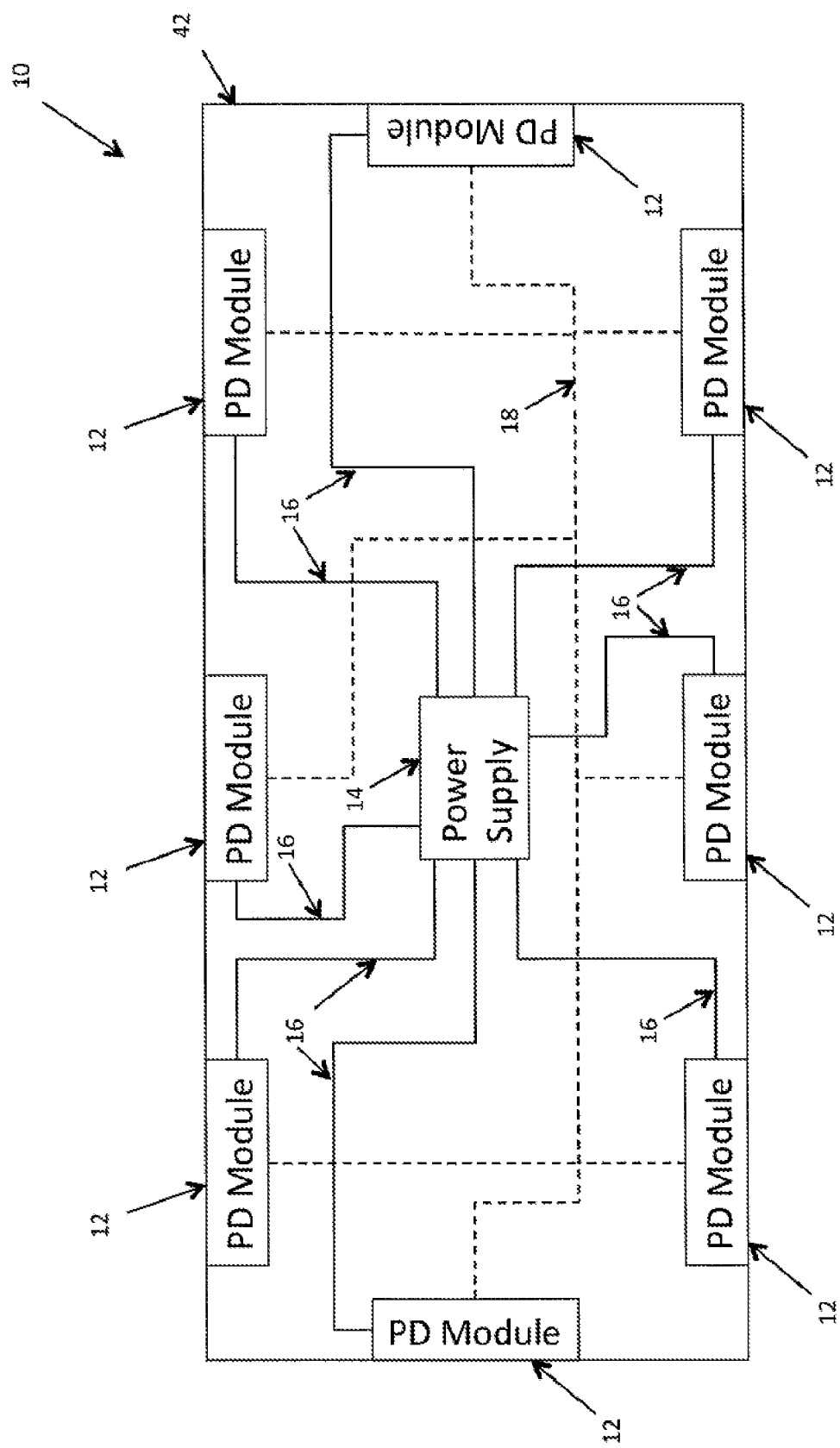
FIG. 4 is a schematic diagram of the power distribution system of FIG. 1 when installed.

Referring to FIG. 4, the USB Power Distribution system 10 is schematically illustrated as being installed on the underside of a conference room table 42. As seen, the PD Modules 12 may advantageously be spread around the periphery of the table 42 to provide a plurality of device charging locations all connected to a single Power Supply 14 via power line 16 under the table 42. The PD Modules 12 are connected to one another via the PDM Bus 18 to control the distribution of power from the Power Supply 14 in the manner discussed above. Although the power line 16 and PDM Bus 18 are shown as being routed separately, in practice, the power line 16, ground wire, and PDM Bus 18 may be three separate, parallel wires that are connected and routed together on the underside of the table 42. Although FIG. 4 illustrates a table 42, the USB Power Distribution system 10 may be mounted to any other structure in accordance with the principles of the present disclosure where multiple USB power ports are needed in close proximity to one another including without limitation to desks, a bar, a countertop, or a community table in a lobby, coffee shop, waiting room, library, airport lounge or gate area or any other similar location.

Although the USB Power Distribution system 10 has been illustrated as a singular system in FIG. 4 for simplicity, it should be readily understood that the system may be implemented in combination with wireless charging systems such as those described in U.S. Patent Application Publication No. 2016/0181859, entitled ECOSYSTEM FOR SURFACE-BASED WIRELESS CHARGING SYSTEM, which is hereby incorporated herein by reference in its entirety.

Additionally, while the PDM Bus 18 may be formed as a single wire as discussed above, it should be readily understood that the PDM Bus 18 may instead be implemented through other known wired or wireless communication links, such as Ethernet, Bluetooth, Wi-Fi or the like.

Although the system 10 has been described above as using generic Power Supplies 14, the Power Supply 14 may optionally include a PDM Bus interface 30, similar to that included in each PD Module 12, that connects the Power Supply 14 to the PDM Bus 18. The Power Supply 14 may then automatically communicate (over the PDM Bus 18) the power capability of the attached Power Supply 14 to the PD Modules 12 attached to the Power Supply 14.

A PDM Bus interface 30 may also optionally be included in an upstream Communications Module to provide an interface between the PDM Bus 18 and the larger world, such as via an internet connection, using either a wired connection (for example, Ethernet or the like) or a wireless connection (for example, LoRa-WAN, SigFox, NB-IOT, Bluetooth, Wi-Fi or the like). The Communications Module would maintain a copy of the Power System Overview Database for the purpose of sending reports to alert the owner or user of the system 10 of events such as excessive load or a fault in the system, or to make the system shut down or start up at specified times, or for billing of the power delivered, or for control of availability of the system.

A PDM Bus interface 30 could also optionally be included in a module integrated into a building security or supervisory system connected to motion detectors, security cameras and other security or control devices, thereby allowing the system to automatically turn on and/or off or the like.

The USB Power Distribution system 10 advantageously provides more flexibility that the currently implemented System Policy Managers, in that, the number of PD Modules 12, and the number or capability of the Primary Power Converter(s) 14 may be unknown at time of initial system installation. If more power outlets are required, additional PD Modules 12 can be added. If more power capability is required, the Primary Power Converter can be changed for a higher power rated converter, or additional power converter(s) may be added, with simple parallel wiring connections. The Distributed System Policy Management of the USB Power Distribution system 10 of the present disclosure advantageously automatically compensates for these changes allowing the USB Power Distribution system 10 to continue distributing power without exceeding the total available power.

This is because there is no single device providing the System Policy Management; rather, the SPM function is shared and distributed equally between the multiple microcontrollers 20 running on each of the PD Modules 12 in a cooperative manner according to a pre-defined PDM Bus interface communication protocol separate from the USB communication bus protocol, and Power Distribution Bus protocol, defined by usb.org.

Additionally, if the total requested load at the PD Modules 12 exceeds the total available power at the Primary Power Converter(s) 14, the distributed System Policy Management of the USB Power Distribution system 10 may advantageously be programmed to implement different power control strategies for different applications. For instance, the system 10 may be configured to charge lower load devices first (e.g. to charge phones before laptops). Alternatively, the system 10 may be configured to iteratively charge some devices at the full power requested while initially denying other devices any power, and then switching those devices that are receiving power at some time interval, thereby minimizing the total time to charge the collection of devices to a certain power level (e.g. 80% power) since many batteries charge more slowly as they near full capacity. It should be understood that various other control strategies and/or algorithms, including those that accommodate Programmable Power Supply characteristics for fast charging, may be implemented by the system 10 depending upon the intended application without departing from the scope of the present disclosure.

Figure 5:
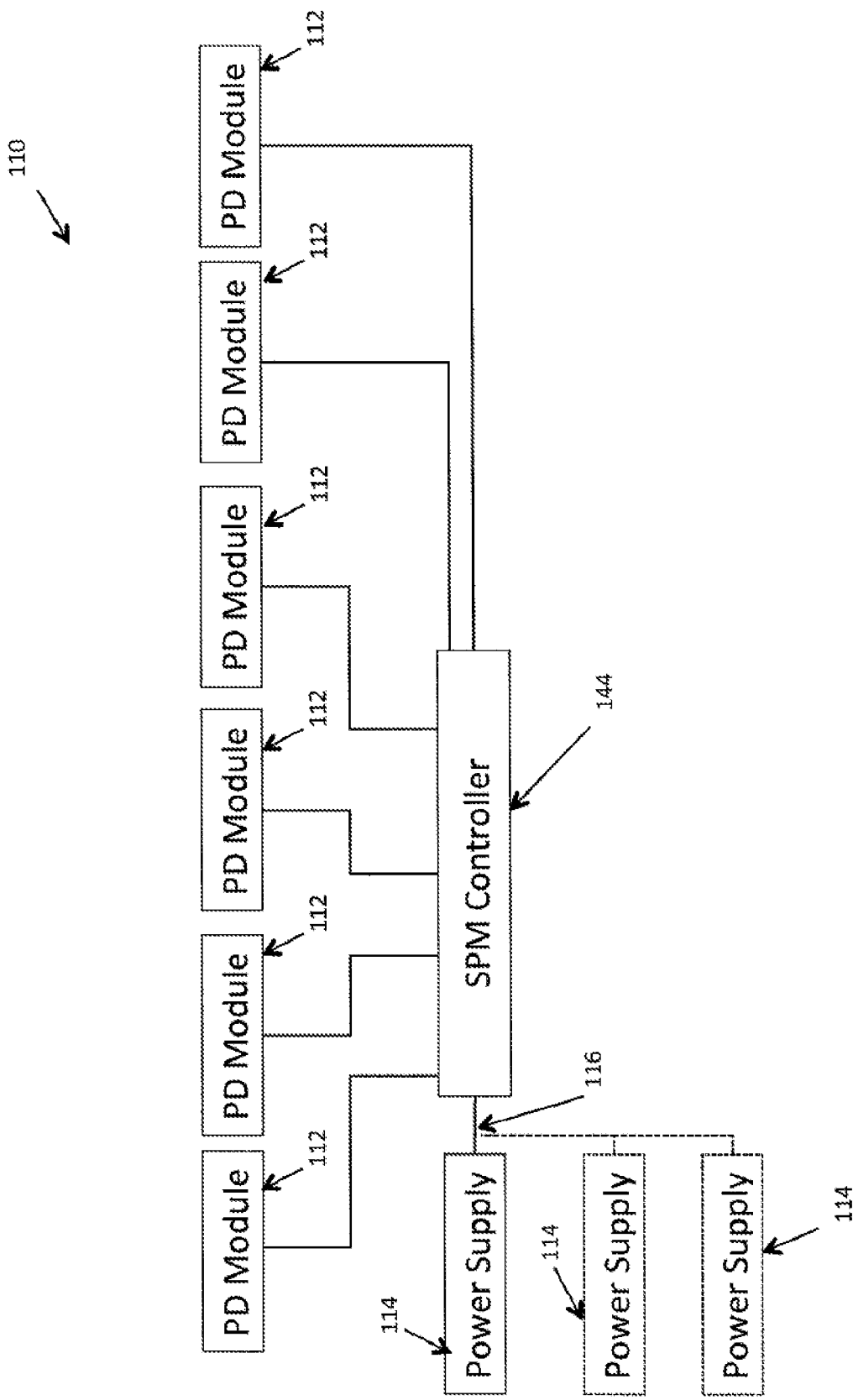
FIG. 5 is schematic diagram of a power distribution system comprising a centralized system policy management controller.
Figure 6:
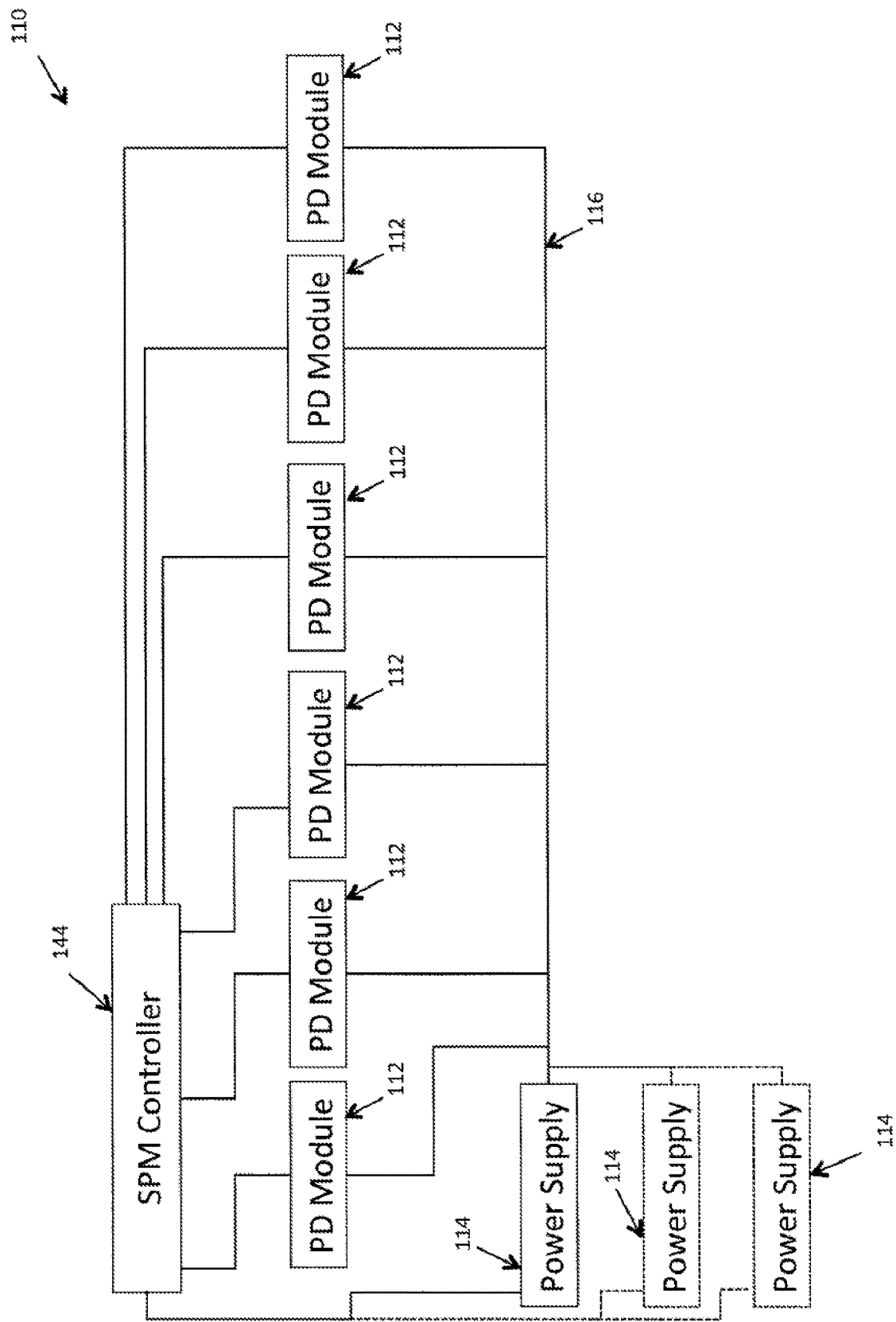
FIG. 6 is schematic diagram of another embodiment of a power distribution system comprising a centralized system policy management controller.

Although the System Policy Management of the system 10 has been described as being distributed amongst the PD Modules 12, referring to FIGS. 5 and 6, wherein like numerals represent like elements, USB Power Distribution system 110 may instead include a single centralized SPM microcontroller 144 linking PD Modules 112 to Primary Power Converter(s) 114 and controlling power distribution from the Primary Power Converter(s) 114 to the PD Modules 12. The centralized SPM microcontroller 144 may, therefore, control power distribution to all of the PD Modules 112 as outlined above and in a manner similar to the way a laptop processor distributes power to its USB ports, without exceeding the total available power to the system 110. Additionally, by linking to the Primary Power Converter(s) 114 and the PD Modules 112, the centralized microprocessor 144 still advantageously provides the ability to handle modularly incrementable power supplies 114 and PD Modules 112 as they are added or removed from the system 110.

While the principles of the present disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A power distribution system comprising:
   at least one power supply;
   a plurality of power distribution modules separate from one another and from the at least one power supply and connected to the at least one power supply and configured to receive power therefrom, each power distribution module of the plurality of power distribution modules including a microcontroller and at least one USB charging port; and
   a power distribution bus connected to each power distribution module of the plurality of power distribution modules;
   wherein the plurality of power distribution modules is configured to execute a distributed system policy management protocol over the power distribution bus to control a supply of available power from the at least one power supply to loads connected to USB charging ports of the power distribution modules;

wherein each power distribution module additionally comprises memory storing a power system database identifying each power distribution module of the plurality of power distribution modules;

wherein the microcontroller of each of the power distribution modules is configured to perform a discover step by broadcasting a message to discover if other power distribution modules are connected to the power distribution bus; and wherein each power distribution module is configured to update its respective power system database with the identity of each power distribution module of the plurality of power distribution modules connected to the power distribution bus after the discover step.

2. The power distribution system according to claim 1, wherein the power distribution bus is a single wire connecting the power distribution modules of the plurality of power distribution modules in parallel.

3. The power distribution system according to claim 1, wherein each power distribution module additionally comprises a bus interface operatively connecting the microcontroller to the power distribution bus, the bus interface allowing the microcontroller to send and receive signals over the power distribution bus.

4. The power distribution system according to claim 3, wherein the bus interface comprises an open-collector transmitter for transmitting signals over the power distribution bus.

5. The power distribution system according to claim 3, wherein the bus interface comprises a voltage sensing comparator configured to receive and monitor voltage on the power distribution bus.

6. The power distribution system according to claim 1, wherein each power distribution module is configured to store a total power required by each power distribution module of the plurality of power distribution modules in its respective power system database.

7. The power distribution system according to claim 6, wherein the microcontroller is configured to transmit a signal over the power distribution bus to update the power system database each time a device is connected to or disconnected from the at least one USB charging port.

8. A power distribution module comprising:
a housing;
a power input configured to receive power from a power supply external to the housing;
at least one USB charging port in the housing;
a microcontroller disposed within the housing and configured to control the distribution of power from the power input to the at least one USB charging port;
a bus interface connectable to a power distribution bus, the bus interface allowing the microcontroller to send and receive signals over the power distribution bus to and from other power distribution modules connected to the power distribution bus and external to the housing; and
a memory;
wherein the microcontroller is configured to control the distribution of power from the power input to the at least one USB charging port based on information received from the other power distribution modules over the power distribution bus
wherein the memory stores a power system database identifying a plurality of other power distribution modules connected to the power distribution bus;
wherein the microcontroller is configured to perform a discover step by broadcasting a message to discover if other power distribution modules are connected to the power distribution bus; and wherein the microcontroller is configured to update the power system database with the identity of each of the plurality of other power distribution modules connected to the power distribution bus after the discover step.

9. The power distribution module according to claim 8, wherein the bus interface comprises an open-collector transmitter for transmitting signals over the power distribution bus.

10. The power distribution module according to claim 8, wherein the bus interface comprises a voltage sensing comparator configured to receive and monitor voltage on the power distribution bus.

11. The power distribution module according to claim 8, wherein the power system database identifies a power available for the at least one USB charging port.

12. The power distribution module according to claim 11, wherein the power system database identifies a total power required by each other power distribution module.

13. The power distribution module according to claim 12, wherein the microcontroller is configured to transmit a signal over the power distribution bus to update the power system database each time a device is connected to or disconnected from the at least one USB charging port.

14. A method for distributing power from at least one power supply through a plurality of power distribution modules separate from one another and in communication over a power distribution bus, each power distribution module of the plurality of power distribution modules including at least one USB charging port, the method comprising:
broadcasting, by each power distribution module, a message to discover if other power distribution modules are connected to the power distribution bus;
maintaining, in memory at each power distribution module, a power system database identifying each power distribution module of the plurality of power distribution modules and a total power required by each power distribution module of the plurality of power distribution modules; and
controlling, by a microprocessor of each power distribution module, a supply of power from the at least one power supply to devices connected to the at least one USB charging port of the power distribution module based on information contained in the respective power system database.

15. The method according to claim 14, additionally comprising:
updating, at each power distribution module, the power system database each time a device is connected to or disconnected from the at least one USB charging port of any of the power distribution modules of the plurality of power distribution modules.

16. The method according to claim 15, additionally comprising:
transmitting, by a power distribution module of the plurality of power distribution modules, a signal over the power distribution bus each time a device is connected to or disconnected from the at least one USB charging port of the power distribution module of the plurality of power distribution modules.

17. The method according to claim 16, additionally comprising:
executing, by each power distribution module of the plurality of power distribution modules, an incremental search protocol to identify the other power distribution module of the plurality of power distribution modules and the total power required by each of the other power distribution modules.

18. The method according to claim 14, additionally comprising:
   updating, at each power distribution module, the power system database each time a power distribution module of the plurality of power distribution modules is powered on.

19. The method according to claim 14, wherein each power distribution module of the plurality of power distribution modules is identified in the power system database by a unique serial number.

20. The method according to claim 14, wherein the power system database additionally stores a total power available from the at least one power supply.

\* \* \* \* \*